(12) United States Patent
Lam et al.

(10) Patent No.: US 9,126,375 B2
(45) Date of Patent: Sep. 8, 2015

(54) SEALANT COMPOSITION AND METHOD OF MAKING IT

(75) Inventors: Koon Fung Lam, Tuen Mun (HK); Wai Ming Chan, Tseung Kwan O (HK)

(73) Assignee: Top Alliance Technology Limited, Road Town, Tortoia (VG)

(*) Notice: Subject to any disclaimer, the term of this patent is extended or adjusted under 35 U.S.C. 154(b) by 119 days.

(21) Appl. No.: 13/275,590

(22) Filed: Oct. 18, 2011

(65) Prior Publication Data

US 2012/0118199 A1 May 17, 2012

(30) Foreign Application Priority Data

Nov. 11, 2010 (HK) ................................. 10110491.1

(51) Int. Cl.
*C09K 3/10* (2006.01)
*C09K 3/12* (2006.01)
*B29C 73/16* (2006.01)

(52) U.S. Cl.
CPC .................................... *B29C 73/163* (2013.01)

(58) Field of Classification Search
None
See application file for complete search history.

(56) References Cited

U.S. PATENT DOCUMENTS

| | | | | |
|---|---|---|---|---|
| 4,195,175 A * | 3/1980 | Peniston et al. | ............. | 536/20 |
| 6,030,701 A * | 2/2000 | Johnson et al. | ............. | 428/343 |
| 2005/0159319 A1 * | 7/2005 | Eoff et al. | ............. | 507/225 |
| 2006/0234871 A1 * | 10/2006 | Dalrymple et al. | ............. | 507/211 |
| 2007/0009570 A1 * | 1/2007 | Kim et al. | ............. | 424/423 |
| 2007/0207186 A1 * | 9/2007 | Scanlon et al. | ............. | 424/424 |
| 2010/0036017 A1 * | 2/2010 | Eoff et al. | ............. | 523/130 |
| 2010/0210745 A1 * | 8/2010 | McDaniel et al. | ............. | 521/55 |
| 2014/0221535 A1 * | 8/2014 | Chan et al. | ............. | 524/29 |
| 2015/0152302 A1 * | 6/2015 | Lam et al. | ............. | 524/386 |

OTHER PUBLICATIONS

Dean, K. et al. "Glycerol plasticised chitosan: A study of biodegradation via carbon dioxide evolution and nuclear magnetic resonance" Polymer Degradation and Stability (2013) pp. 1-11.*

* cited by examiner

*Primary Examiner* — Kaj K Olsen
*Assistant Examiner* — Ross J Christie
(74) *Attorney, Agent, or Firm* — Raymond R. Ferrera; Adams and Reese LLP

(57) ABSTRACT

Valve-through tire puncture sealant compositions including dissolved and undissolved natural bio-materials, anti-freezing agents and other rigid particles are invented. In the preparation, an aqueous solution with 0.1-10 wt % dissolved bio-materials and 0.1%-10 wt % tackifier is mixed with anti-freezing agent, in which 0.01-5 wt % rigid particles of bio-materials and other particles are suspended. Weight percentage of water and anti-freezing agent are 20-40 wt % and 20-70 wt % respectively. Trace amounts of additives such as coloring and preservative are possibly added to the sealant. The invention includes the method for preparing the sealant composition containing bio-materials. The proposed sealant compositions have several advantages: Environmentally friendly, insignificant settling, long shelf-life, etc. The sealant is capable of sealing puncture formed by less than or equal to 6.35 mm spike for long duration, i.e. more than 30 hours.

15 Claims, 1 Drawing Sheet

SEALANT COMPOSITION AND METHOD OF MAKING IT

CROSS-REFERENCE TO RELATED APPLICATIONS

Pursuant to 35 U.S.C. 119(a), the instant application claims priority to prior Hong Kong application number 10110491.1, filed Nov. 11, 2010.

FIELD OF THE INVENTION

The present invention relates to a tire puncture sealant. It contains dissolved bio-materials which functions as soft and flexible material for sealing a puncture while undissolved particles in the sealant functions as rigid particles for enhancing the sealing performance. The tire sealant composition is environmentally friendly, non-toxic and effective.

BACKGROUND OF THE INVENTION

Tires are occasionally punctured by hard objects, such as nails, stones, etc, on road. Flattening of the tires is resulted due to air-leaking through the puncture. It could cause serious accident and severe physical injure to the drivers, particularly when the car is running on highway. Additional accident occasionally happened when the driver attempted to replacing the flattened tire in highway network.

Liquid tire sealant is used for sealing of tire puncture temporarily when the tires are in operation. This provides an emergency measure for the driver to continue the journey and seek for help even after the tire is punctured so as to prevent any serious accident to be happened due to the tire flattening.

In general, a liquid tire sealant consists of sealing materials, tackifier and solvent with anti-freezing agent. The common sealing materials include latex, butyl rubber and various particulates. Tackifiers are chemicals used for increasing the tackiness. A common tackifier used for tire sealant is resin compound. Anti-freezing agent, such as ethylene glycol and propylene glycol, is used to lower the freezing point of the tire sealant in order to prevent the sealant from freezing at low temperature operating environment.

In the early stage of tire sealant development, as described in U.S. Pat. Nos. 4,116,895 and 4,426,468, butyl rubber and latex were used as the main components for sealing purpose. As cross-linking agents (i.e. organometallic catalysts) were needed for the proper function, the sealing ability is highly sensitive to the amount of catalyst. The drawbacks of these compositions include unstable performance, short shelf-life, difficulty to clean up after usage and requirement of curing process.

U.S. Pat. Nos. 4,337,322 and 4,588,758 described the further development of tire sealant. These patents disclosed the use of asbestos fiber, ethylene glycol and detergent as main components in the valve-open type sealant. It is well known that asbestos fiber is carcinogenic whereas ethylene glycol is toxic to environment.

In light of the environmental concerns, a non-petroleum based, environmentally safer tire sealant was disclosed (U.S. Pat. No. 5,059,636). In the formulation, in addition to ground rubber, wheat flour was used. Sodium nitrite was used as preservative for longer shelf-life. On the other hand, freezing point of the aqueous sealant solution was lowered by addition of calcium salt instead of glycol compound. The only drawback is that the valve core needed to be removed before applying the sealant.

Instead of water-based tire sealant, formulations with organic propellants were developed (U.S. Pat. Nos. 490,242 and 5,648,406) through the use of halogenated compounds and other organic solvent such as acetone are potentially hazardous to the environment despite of their high sealing performance.

At the mean time, another sealant formula was purposed in U.S. Pat. No. 5,772,747. The sealant functions based on the mechanism called "log-jam". Indeed, mixture of particles including cellulose, xanthan gum, carbopol polymer, wool, nylon, rayon, wollastonite and other flat plate-like particles were suspended in water-based solvent. A tire puncture can be filled up by the fibrous materials in a viscous medium, tuned by addition of polyglycol. Propylene glycol was added to lower down the freezing point of the sealant. Other constituents including colouring, preservative and anti-corrosion additives were added.

With similar functional mechanism, sealant formulation consisting of surface activated ground rubber, styrene butadiene latex, polysaccharide Xanthan gum was disclosed (U.S. Pat. No. 5,856,376). Nevertheless, it was still valve-open type sealant.

In U.S. Pat. No. 6,013,697, bentonite clay and mica were used as the main constituents in the disclosed formulation. These particulates filled the puncture voids and formed a clog to prevent further air leak. The valve-through type sealant was environmentally safe and it has quick sealing performance. However, settling and flocculation of clay platelets were the main issues for this sealant.

Other works based on the log-jam mechanism mainly used natural organic materials include US 2002/0077391 A1 in which chopped polyethylene, cellulose, and ceramic fibers were used; US 2005/0277712 A1 in which by-products of crop such as sugar beets, sugar cane, corn and timber were used as the particulates; International Patent WO 2008/022402 A1 in which the sealant contained Xanthan gum, cellulose, fumed silica, peanut shell, bark powder, tea powder, parsley powder, bentonite, gum resin and trace titanium dioxide; US 2007/0015850 A1 in which plant protein such as cereal grains, corn and wheat were used; US 2007/0129464 A1 mentioned the use of fiberous materials including molasses, i.e. cane, sugar beet, corn, soybean, lignin, wool, glass wool, cotton, etc.

Other works based on the log-jam mechanism mainly used synthetic materials include US 2007/0203260 A1 in which urethane emulsion (synthetic resin) and polyols were used; International application number PCT/AU2008/001499 in which sodium polyacrylate and ground rubber were the main components of the disclosed tire sealant.

In addition to the "log-jam" principle, another type of sealants was based on tackified latex suspension. The latex suspension was a highly viscous liquid that could adhere on the puncture wall firmly and eventually blocked the air leaking channel. The related patents include but not limited to EP 1382654 A1, U.S. Pat. No. 6,992,119 B2 and US 2006/0142420 A1. However, the disadvantages of latex-based sealant were difficulty to clean after usage, problematic sticky nature, irritation to eyes and skins, use of volatile organic compounds, etc.

SUMMARY OF THE INVENTION

This invention discloses a new tire sealant composition based on a combined mechanism of both log-jam and viscous gel clogging (i.e. Latex) principles. The proposed sealant composition functions by log-jamming of rigid particles, together with gel clogging of flexible gel particles (also known as hydrogel) in-between the rigid particle boundary in order to strengthen the sealing ability and duration. The formulation is environmentally friendly, safe, non-toxic and highly effective (i.e. instantly sealing ability) to seal tire punctures. The puncture sizes being sealed depend on the particle sizes and amounts of the solid content of the sealant. It can seal punctures caused by at least 6.35 mm spike. It is a valve-through type sealant that can be applied conveniently without removing the valve core before injection. The sealant can function well between −30° C. and 70° C. The sealing maintains between 12 to 48 hours or above, depending on the exact sealant composition. The applied sealant can be easily cleaned by water after usage.

The proposed sealant composition consists of both dissolved and undissolved polymer materials. The dissolved molecules are re-structured from its original, rigid form to be soft and flexible suspension. Due to its tunable flexibility in physical and chemical properties, it can be squeezed and filled up the grain boundaries of the log-jammed particles in the puncture. This provides a superior sealing performance to the disclosed formula. Addition of tackifier or another type of hydrogel such as sodium alginate increases both the viscosity of the sealant and the tack of the flexible dissolved polymer chains so that it can adhere on the puncture wall and the surface of jammed particles thinly. Indeed, the sodium alginate increased particle size of the soft, flexible chitosan gel. Anti-freezing agents with low toxicity such as propylene glycol, calcium chloride and/or magnesium chloride is used to decrease the freezing point of the aqueous liquid sealant. Other additives such as preservative, anti-corrosion agent, firming agent and colouring are added to improve the shelf-life and aesthetics of the sealant.

DETAILED DESCRIPTION OF THE PREFERRED EMBODIMENTS

A tire sealant composition according to the present invention consists of at least a kind of naturally derived materials. The material is partly converted to be flexible and soft suspended material by physical or chemical method whilst the remaining particles are in rigid form. Other rigid solid particles can also be added to improve the sealing performance. The liquid medium of the sealant is composed of water and anti-freezing agent which widen the operating temperature of the sealant. Tackifier is added for both increasing the viscosity of the solution and improving the tack of the rigid and flexible suspended solid to the puncture wall. Anti-corrosion additive may be added to prevent the occurrence of rusting. Preservative may also be added to extend the shelf-life of the sealant. Zinc oxide or titanium oxide is added to prevent from the decomposition under sunlight exposure. Other additives such as odoring and colouring may be added optionally without affecting the sealing function.

Figure 1:
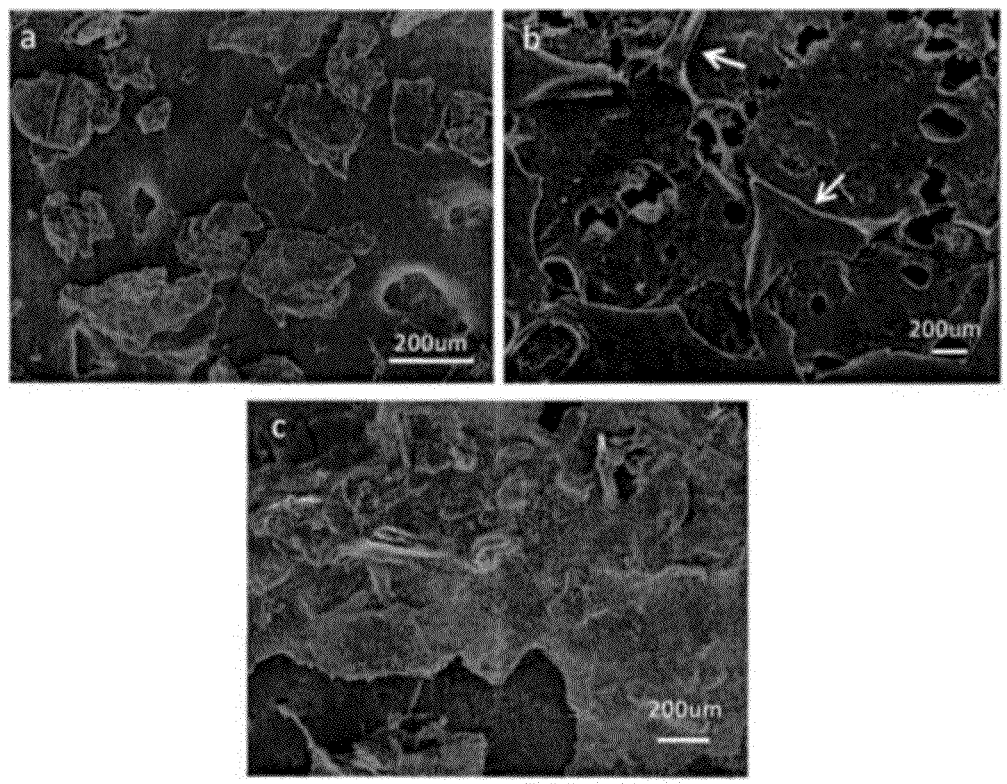
FIG. 1 scanning electron microscope images of rigid and re-precipitated chitosan, wherein, (a) Rigid chitosan particles, (b) re-precipitated chitosan particles after neutralization and (c) the mixture of gel chitosan with rigid chitosan from the prepared sealant.

In the preferred embodiment, chitosan is used as the flexible gel material for sealing purpose. Chitosan is produced by deacetylation of chitin, which is commonly found in the exoskeleton of crustaceans. It exists in rigid flakes which can be dissolved in acidic medium. The acid can be any kind of acid, but preferably to be acetic acid and hydrochloric acid due to their low toxicity. Prior to the dissolution, the chitosan is re-precipitated by neutralization using any kind of alkali, preferably sodium hydroxide. The re-precipitated chitosan has a different particle structure from its original form. It is soft, semi-transparent and flexible gel material suspending in the aqueous medium. The exact gel particle size and rigidity depends on the rate of neutralization and the final pH of the solution. In FIG. 1, scanning electron microscope images of rigid and re-precipitated chitosan are shown. It is noted that chitosan is only shown as an example. Other similar materials that can exist as gel material in the given liquid medium are also valid for preparing the sealant composition, with the combined sealing mechanism described above.

Figure 2:
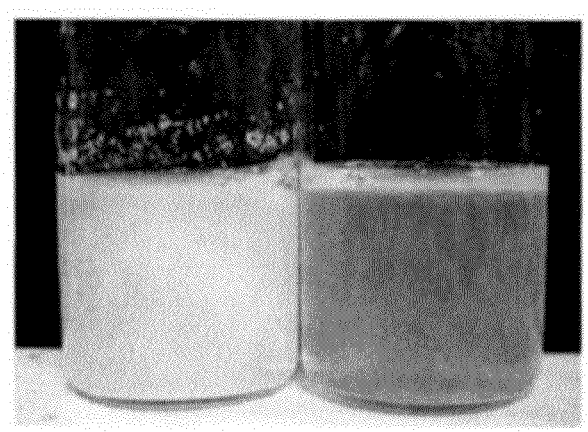
FIG. 2 shows the photograph of re-precipitated chitosan at different concentrations.

In the preferred embodiment, the sealant composition consists of 0.1-5 wt % re-precipitated chitosan, which prepared from dissolving 50-500 microns chitosan particles in acidic condition, and the final pH of the aqueous suspension is between pH 7-10. FIG. 2 shows the photograph of re-precipitated chitosan at different concentrations.

The water content in the sealant composition is between 30-60 wt %. It provides a medium for suspending the soft gel chitosan and other rigid particles and for dissolving various additives to be added optionally.

The viscosity of the aqueous suspension is adjusted by adding tackifier. Two examples are sodium alginate and starch. These natural materials are used to tune the viscosity of aqueous solution effectively. In the preferred embodiment, the amount of tackifier to be added is 0.1-10 wt %, depending on the targeted viscosity needed. It is typically in the range of 30-5000 mPas. In addition to the sodium alginate, other viscosity tuning agent can be used.

The freezing point of the aqueous suspension is depressed by the use of anti-freezing agent, such as propylene glycol, to broaden the applicability of the sealant composition. In the preferred embodiment, the sealant composition consists of 30-90 wt % propylene glycol. The freezing point is typically lowered down to −30° C. with 50-60 wt % of propylene glycol. Inorganic anti-freezing agent such as 1-10 wt % calcium chloride or magnesium chloride can also be used in the preferred embodiment.

In addition to the hydrogel (soft, flexible chitosan particles), the rigid chitosan particle is present as a sealant component in an amount of 0.1-5 wt %, and mostly preferably between 1-3 wt %. The particle size of rigid chitosan particles are between 10-300 microns, preferably between 5-50 microns. The rigid particles accumulate in the puncture based on the log-jam mechanism. The plug formed by the jammed particles combine with the soft, flexible chitosan materials in the solution to provide superior sealing performance to the puncture. Since both soft, flexible chitosan and the rigid chitosan are from the same source, their compatibility in the sealing mechanism is excellent.

For the rigid particle component in the sealant, it is not limited to the chitosan material. Other solid particles with the size ranging from 0.1 micron to 300 microns are used in this embodiment. In the following examples, koalinite, silica, wollatonite, diatomite, mica, mesoporous silica and colloidal silica are used for the sealant preparation and sealing demonstration. The particles are preferably to have specific gravity lower than 1.5 to reduce settling rate, though particles with higher density can also be used. Furthermore, 0.05-3 wt % of bentonite is used to prevent settling and sedimentation problems occurred in the sealant.

Preservative at 0.1 to 5 wt %, such as sodium nitrite, is also added to the sealant composition. It is used for preserving the components in the sealant formula in order to extend its shelf-life up to five years or more.

Anti-corrosion additive at 0.1 to 3 wt % is added to prevent occurrence of rusting inside the tire.

Viscosity and pH of the prepared sealant are in the range of 30-5000 mPas and 7-11 respectively. The sealant has insignificant settling within 24 hours due to the presence of soft, flexible chitosan gel particles as well as the tackifier, together with bentonite. The sealant maintains its proper function for five years due to the presence of preservative.

In operation, the sealant is injected into a tire through a hose under high pressure, preferably 3-7 bar, with or without removing the valve core. When there is no puncture, the sealant liquid is kept mixing in the rotating tire without any significant physical and chemical changes. In addition, the sealant is able to spread inside the tire efficiently so that puncture occurred at shoulder area can also be sealed.

The sealant performance is tested by injecting 300 ml of the prepared sealant in a 165/60 R14 aged tires through a hose under high pressure, preferably 3-7 bar, without removing the valve core. It is worth to note that the volume of sealant injected can be less than 300 ml. However, this value is used as a benchmark in the tests. The tire is then rotated by special-designed machine for 5 minutes. A puncture is made on the tire using a typically 6.35 mm spike before or during the rotation. Spikes with other sizes are also tested. The tire is kept rotating for another 5 minutes at 300 rpm with pressing on metal bar to simulate the weight loaded on the tire in reality. The tire is kept stationary with the puncture location pointing upwards. Air leakage from the puncture is checked every hour by applying soap solution. After passing the test, the sealing performance is confirmed by actual road test by vehicles.

EXAMPLES

Hereinafter, a few examples based on the present invention are described. However, the present invention is not limited to these examples.

Example 1

PD-10

Sealant A consisted of 30-50 wt % water, 50-65 wt % propylene glycol, 0.1-5 wt % re-precipitated chitosan particles, 5 wt % glycerine, 0.1-2 wt % sodium alginate and 0.01-2 wt % rigid chitosan particles. Viscosity of the prepared sealant was between 30-500 mPas and the solution was at pH 8-10. The sealant was able to seal punctures created by 6.35 mm spike for 48 hours. The sealant functioned at −30° C., 30° C. and 70° C. In addition, the sealant has negligible settling more than 1 week stagnant storage.

Example 2

PD-10 RM-1

Sealant B consisted of 30-50 wt % water, 50-65 wt % propylene glycol, 0.1-0.3 wt % re-precipitated chitosan particles, 0.1-2 wt % sodium alginate and 0.01-0.5 wt % rigid chitosan particles. This composition also contained 0.1-5 wt % of other rigid particles including koalinite, silica and colloidal silica. The viscosity of sealant was 50-800 mPas and the solution was at pH 8-10. The sealant was able to seal puncture created by 6.35 mm spike for 48 hours. The sealant functioned at −30° C., 30° C. and 70° C. In addition, the sealant has negligible settling more than 1 week stagnant storage.

Example 3

R-4

Sealant C consisted of 30-50 wt % water, 50-65 wt % propylene glycol, 0.1-3 wt % re-precipitated chitosan particles, 0.1-2 wt % sodium alginate and 0.01-0.5 wt % rigid chitosan particles. This composition also contained 0.1-4 wt % sericin and other soluble organic polymers, together with 0.1-5 wt % of other rigid particles including koalinite, silica and colloidal silica. The viscosity of sealant was 50-1000 mPas and the solution was at pH 8-10. The sealant was able to seal puncture created by 6.35 mm spike for 48 hours. The sealant functioned at −30° C., 30° C. and 70° C. In addition, the sealant has negligible settling more than 1 week stagnant storage.

Example 4

AS2-FS2

Sealant D consisted of 30-50 wt % water, 50-65 wt % propylene glycol, 0.1-5 wt % Acrylic glue, 0.1-3 wt % re-precipitated chitosan particles, 0.1-2 wt % sodium alginate and 0.01-0.5 wt % rigid chitosan particles. This composition also contained 0.1-5 wt % Acrylic glue, together with 0.1-5 wt % of other rigid particles including koalinite, silica and colloidal silica. The viscosity of sealant was 50-1000 mPas and the solution was at pH 8-10. The sealant was able to seal puncture created by 6.35 mm spike for 48 hours. The sealant functioned at −30° C., 30° C. and 70° C.

Example 5

NOSA-21

Sealant E consisted of 30-50 wt % water, 50-65 wt % propylene glycol, 0.1-5 wt % Acrylic glue, 0.1-3 wt % re-precipitated chitosan particles and 0.01-0.5 wt % rigid chitosan particles. This composition has no sodium alginate. The viscosity of sealant was 50-1000 mPas and the solution was at pH 8-10. The sealant was able to seal puncture created by 6.35 mm spike for 48 hours. The sealant functioned at −30° C., 30° C. and 70° C. In addition, the sealant has negligible settling more than 1 week stagnant storage.

What is claimed is:

1. A tire sealant composition, comprising: a liquid carrier, viscosity and suspending agent, fillers in both flexible and rigid forms, and additives;
    wherein the liquid carrier comprises water and an anti-freezing agent; and
    wherein at least one of the fillers is re-precipitated chitosan.

2. The sealant composition according to claim 1, wherein the composition comprises 30-95 wt % liquid carrier, 0.1-5 wt % viscosity and suspending agents, 0.1-5 wt % fillers, and 0.1-5 wt % additives.

3. The sealant composition according to claim 1, wherein the additives comprise corrosion inhibitors and preservatives.

4. The sealant composition according to claim 1, wherein the sealant composition is either valve-through or valve-open type.

5. The sealant composition according to claim 1, wherein, the sealant composition comprises water, propylene glycol, glycerine, sodium alginate, gel particles and rigid particles.

6. The sealant composition according to claim 5, wherein the rigid particles have a particle size in the range of 1 μm to 500 μm.

7. The sealant composition according to claim 6, wherein, the sealant composition further comprises rigid koalinite particles, rigid silica particles and rigid colloidal silica particles.

8. The sealant composition according to claim 7, wherein, the sealant composition further comprises sericin and soluble organic polymers.

9. The sealant composition according to claim 8, wherein, the sealant composition comprises 0.1-3 wt % re-precipitated chitosan particles, 0.1-1 wt % rigid chitosan particles, 0.1-4 wt % sericin and soluble organic polymers, and 0.1-5 wt % rigid koalinite particles, rigid silica particles and rigid colloidal silica particles.

10. The sealant composition according to claim 9, wherein, the viscosity of the sealant composition is 50-1000 mPas and the sealant composition is at pH 8-10.

11. The sealant composition according to claim 9, wherein, the sealant composition functions at −30° C., 30° C. and 70° C. and has negligible settling more than 1 week stagnant storage.

12. The sealant composition according to claim 1, wherein the sealant composition for sealing tire punctures does not contain any ammonia and toxic chemicals.

13. The sealant composition according to claim 1, wherein the sealant composition can seal tire puncture within a few seconds, can seal the tire puncture for more than 48 hours with high reproducibility and can be cleaned easily by water flushing after its application.

14. The sealant composition according to claim 1, wherein the viscosity and suspending agent comprises a tackifier.

15. The sealant composition according to claim 1, wherein the fillers in both flexible and rigid forms comprise an anti-corrosion additive.

* * * * *